US010345449B2

(12) United States Patent
Salti et al.

(10) Patent No.: US 10,345,449 B2
(45) Date of Patent: Jul. 9, 2019

(54) VEHICLE CLASSIFICATION USING A RECURRENT NEURAL NETWORK (RNN)

(71) Applicant: Fleetmatics Ireland Limited, Dublin (IE)

(72) Inventors: Samuele Salti, Prato (IT); Francesco Sambo, Padua (IT); Leonardo Taccari, Florence (IT); Luca Bravi, Scandicci (IT); Matteo Simoncini, Pistoia (IT); Alessandro Lori, Florence (IT)

(73) Assignee: VERIZON CONNECT IRELAND LIMITED, Dublin (IE)

( * ) Notice: Subject to any disclaimer, the term of this patent is extended or adjusted under 35 U.S.C. 154(b) by 241 days.

(21) Appl. No.: 15/601,814

(22) Filed: May 22, 2017

(65) Prior Publication Data

US 2018/0157963 A1   Jun. 7, 2018

Related U.S. Application Data

(63) Continuation-in-part of application No. 15/518,694, filed as application No. PCT/EP2016/079625 on Dec. 2, 2016.

(51) Int. Cl.
*G06N 3/04* (2006.01)
*G06N 3/08* (2006.01)
(Continued)

(52) U.S. Cl.
CPC ............... *G01S 19/14* (2013.01); *G06N 3/02* (2013.01); *G06N 3/0445* (2013.01);
(Continued)

(58) Field of Classification Search
CPC .......... G01S 19/00; G01S 19/01; G01S 19/13; G01S 19/14; G01S 19/31; G01S 19/38;
(Continued)

(56) References Cited

U.S. PATENT DOCUMENTS 9,846,977 B1 * 12/2017 Cox ......................... G07C 5/02
2002/0128751 A1 * 9/2002 Engstrom ............ G05B 13/027
701/1

(Continued)

FOREIGN PATENT DOCUMENTS

WO   WO-2016145547 A1 * 9/2016 ........... G06N 3/0454

OTHER PUBLICATIONS

Hussain et al., "On-road vehicle classification based on random neural network and bag-of-visual words," 2016, Probability in the Engineering and Informational Sciences (Year: 2016).*
(Continued)

*Primary Examiner* — Thomas G Black
*Assistant Examiner* — Sara J Lewandroski

(57) ABSTRACT

A device can receive GPS data or values for a set of metrics at a set of GPS points that form a GPS track of a vehicle. The device can determine additional values for additional metrics using the GPS data or the values for the set of metrics. The device can determine a set of vectors for the set of GPS points using the GPS data, the values, or the additional values. The set of vectors can be used in a recurrent neural network (RNN) to classify the vehicle. The device can process the set of vectors via one or more sets of RNN layers of the RNN. The device can determine a classification of the vehicle using a result of processing the set of vectors. The result can be output by the output layer. The device can perform an action based on the classification of the vehicle.

20 Claims, 8 Drawing Sheets

(51) Int. Cl.
　　　*G01S 19/14*　　　(2010.01)
　　　*G06N 3/02*　　　(2006.01)
　　　*G05B 13/02*　　　(2006.01)
　　　*G08G 1/01*　　　(2006.01)

(52) U.S. Cl.
　　　CPC ......... *G06N 3/0454* (2013.01); *G05B 13/027* (2013.01); *G05B 2219/21002* (2013.01); *G08G 1/0129* (2013.01)

(58) Field of Classification Search
　　　CPC .......... G01S 19/39; G01S 19/42; G01S 19/45; G01S 19/46; G01S 19/47; G01S 19/48; G01S 19/49; G01S 19/50; G01S 19/51; G01S 19/52; G01S 19/53; G08G 1/0104; G08G 1/011; G08G 1/012; G08G 1/0125; G08G 1/0129; G08G 1/0133; G08G 1/0137; G06N 3/02; G06N 3/04; G06N 3/0436; G06N 3/0445; G06N 3/0454; G06N 3/0472; G06N 3/063; G06N 3/08; G06N 3/082; G05B 2219/25255; G05B 2219/39271; G05B 2219/21002; G05B 13/027; G05B 13/0285; G05B 23/0243; G05B 23/0254; G06F 16/285
　　　See application file for complete search history.

(56) References Cited

U.S. PATENT DOCUMENTS

| | | | | |
|---|---|---|---|---|
| 2015/0266455 | A1* | 9/2015 | Wilson | G09B 19/10 |
| | | | | 701/93 |
| 2017/0163616 | A1* | 6/2017 | Smith | H04L 63/061 |
| 2017/0270406 | A1* | 9/2017 | Visser | G06N 3/04 |
| 2017/0355370 | A1* | 12/2017 | Tsumori | B60W 30/18 |
| 2018/0047288 | A1* | 2/2018 | Cordell | B60Q 9/008 |
| 2018/0120843 | A1* | 5/2018 | Berntorp | G06K 9/00791 |
| 2018/0154899 | A1* | 6/2018 | Tiwari | G08G 1/0112 |

OTHER PUBLICATIONS

Godbout, "Recurrent Neural Networks for Beginners," Aug. 12, 2016, Medium, Retrieved from https://medium.com/@camrongodbout/recurrent-neural-networks-for-beginners-7aca4e933b82 (Year: 2016).*
Hastie et al., "The Elements of Statistical Learning," Feb. 2009, Springer, Chapter 11 (pp. 389-416) (Year: 2009).*
Bolbol, et al., "Inferring hybrid transportation modes from sparse GPS data using a moving window SVM classification", Computers, Environment and Urban Systems Elsevier Science Ltd. UK, vol. 36, No. 6, Nov. 2012, pp. 526-537.
Xing, et al., "Online Travel Mode Identification Using Smartphones With Battery Saving Considerations", IEEE Transactions on Intelligent Transportation Systems, IEEE, Piscataway, NJ, USA, vol. 17, No. 10, Oct. 1, 2016, pp. 2921-2934.
Zhanbo, et al., "Vehicle classification using GPS data", Transportation Research. Part C, Emerging Technologies, vol. 37, Dec. 2013, pp. 102-117.
Rosenblatt et al., "The Perceptron—A Perceiving and Recognizing Automaton", Cornell Aeronautical Laboratory, Inc., 1957, 33 pages.
Breiman, "Random Forests", Machine Learning, 45, pp. 5-32, 2001.
Cortes et al. "Support-Vector Networks", Machine Learning, 20, pp. 273-297 (1995).
Guyon et al., "Gene Selection for Cancer Classification using Support Vector Machines", Machine Learning, 46, pp. 389-422 (2002).
Kira et al., "A Practical Approach to Feature Selection", 1992, 8 pages.
Benoit et al., "Feature selection for nonlinear models with extreme learning machines", Jan. 2012, pp. 111-124.
Zaffalon et al., "Robust Feature Selection by Mutual Information Distributions", 2002, 8 pages.
Bi et al, "Dimensionality Reduction via Sparse Support Vector Machines", Journal of Machine Learning Research 3 (2003) pp. 1229-1243.
Seth et al., "Variable selection: A statistical dependence perspective", 2010 Ninth International Conference on Machine Learning and Applications (2010), pp. 931-936.
Breiman et al., "Classification and Regression Trees", CRC Press, New York, (1999) 358 pages.
Abadi et al., "TensorFlow: Large-scale machine learning on heterogeneous systems", http://tensorflow.org/, 2015, 4 pages.
Bolbol et al., "Inferring hybrid transportation modes from sparse GPS data using a moving window SVM classification", Computers, Environment and Urban Systems special Issue: Advances in Geocomputation, 2012, 12 pages.
Brodersen et al, "The balanced accuracy and its posterior distribution", In: Pattern recognition (ICPR), 2010 20th international conference on. IEEE, 2010, 4 pages.
Chollet, "Keras", https://github.com/fchollet/keras, 4 pages.
Dong et al., "Characterizing driving styles with deep learning", http://arxiv.org/abs/1607.03611, 2016, 10 pages.
Gebru et al., "Using Deep Learning and Google Street View to Estimate the Demographic Makeup of the US", http://arxiv.org/abs/1702.06683, 2017, 41 pages.
Gonzalez et al., "Automating mode detection using neural networks and assisted GPS data collected using GPS-enabled mobile phones", In: 15th World congress on intelligent transportation systems, 2008, 12 pages.
Gupte et al., "Detection and classification of vehicles", IEEE Transactions on intelligent transportation systems, 2002, 27 pages.
Guyon et al., "An introduction to variable and feature selection", Journal of machine learning research, 2003, 26 pages.
Hallenbeck et al., "Verification, refinement, and applicability of long-term pavement performance vehicle classification rules", Tech. rep., 2014, 162 pages.
Le et al., "A simple way to initialize recurrent networks of rectified linear units" arXiv preprint, http://arxiv.org/abs/1504.00941, 2015, 9 pages.
Leduc, "Road traffic data: Collection methods and applications", Working Papers on Energy, Transport and Climate Change (1), 2008, 55 pages.
Simoncini et al., "Vehicle classification from low frequency GPS data", IEEE 16th International Conference on Data Mining Workshops (ICDMW), 2016, 8 pages.
Song et al., Deeptransport: Prediction and simulation of human mobility and transportation mode at a citywide level, In: Proceedings of the Twenty-Fifth International Joint Conference on Artificial Intelligence, IJCAI 2016, New York, NY, USA, Jul. 9-15, 2016, 7 pages.
Sun et al., "Vehicle classification using GPS data", Transportation Research Part C: Emerging Technologies. 2013, 16 pages.
Wyman et al., "Field evaluation of FHWA vehicle classification categories", Maine Department of Transportation, Bureau of Highways, Materials and Research Division, Jan. 1985, 18 pages.
Xiao et al., "Travel mode detection based on GPS track data and Bayesian networks", Computers, Environment and Urban Systems, 2015, 15 pages.
Yang, 1999. An evaluation of statistical approaches to text categorization. Information retrieval 1 (1-2), 69-90.
Zheng et al., "Learning transportation mode from raw GPS data for geographic applications on the web", In: Proceedings of the 17th international conference on World Wide Web. ACM, 2008, 10 pages.
Zhou et al., "Image-based vehicle analysis using deep neural network: A systematic study", http://arxiv.org/abs/1601.01145, 2016 5 pages.
PTV Group, http://xserver.ptvgroup.com/, 7 pages.
Open Street Map, http://www.openstreetmap.org/, 1 page.
Verizon, "Roadside Assistance", https://www.verizonwireless.com/connected-devices/hum-by-verizon, 10 pages.
Gers et al., "Learning to forget: Continual prediction with LSTM", Neural computation, 2000, 19 pages.
Glorot et al., "Understanding the difficulty of training deep feedforward neural networks", JMLR W&CP: Proceedings of the Thirteenth

(56) References Cited

OTHER PUBLICATIONS

International Conference on Artificial Intelligence and Statistics (AISTATS 2010), May 2010, 8 pages.
Hochreiter et al., "Long short-term memory", Neural computation, 1997, 32 pages.
Ioffe et al., Batch normalization: Accelerating deep network training by reducing internal covariate shift, http://arxiv.org/abs/1502.03167, 2015, 11 pages.
Kingma et al., "Adam: A method for stochastic optimization", http://arxiv.org/abs/1412.6980, 2015, 15 pages.
Nair et al., "Rectified linear units improve restricted boltzmann machines", 27th International Conference on Machine Learning (ICML-10). Omnipress, 2010, 8 pages.
Pascanu et al., "On the difficulty of training recurrent neural networks", ICML, 2013, 9 pages.
Saxe et al., "Exact solutions to the nonlinear dynamics of learning in deep linear neural networks", http://arxiv.org/abs/1312.6120, 2013, 22 pages.
Wikipedia, "Recurrent neural network," https://wikipedia.org/wiki/Recurrent_neural_network, May 13, 2017, 12 pages.
Lecun et al., "Deep Learning," https://www.cs.toronto.edu/~hinton/absps/NatureDeepReview.pdf, May 28, 2015, 9 pages.

\* cited by examiner

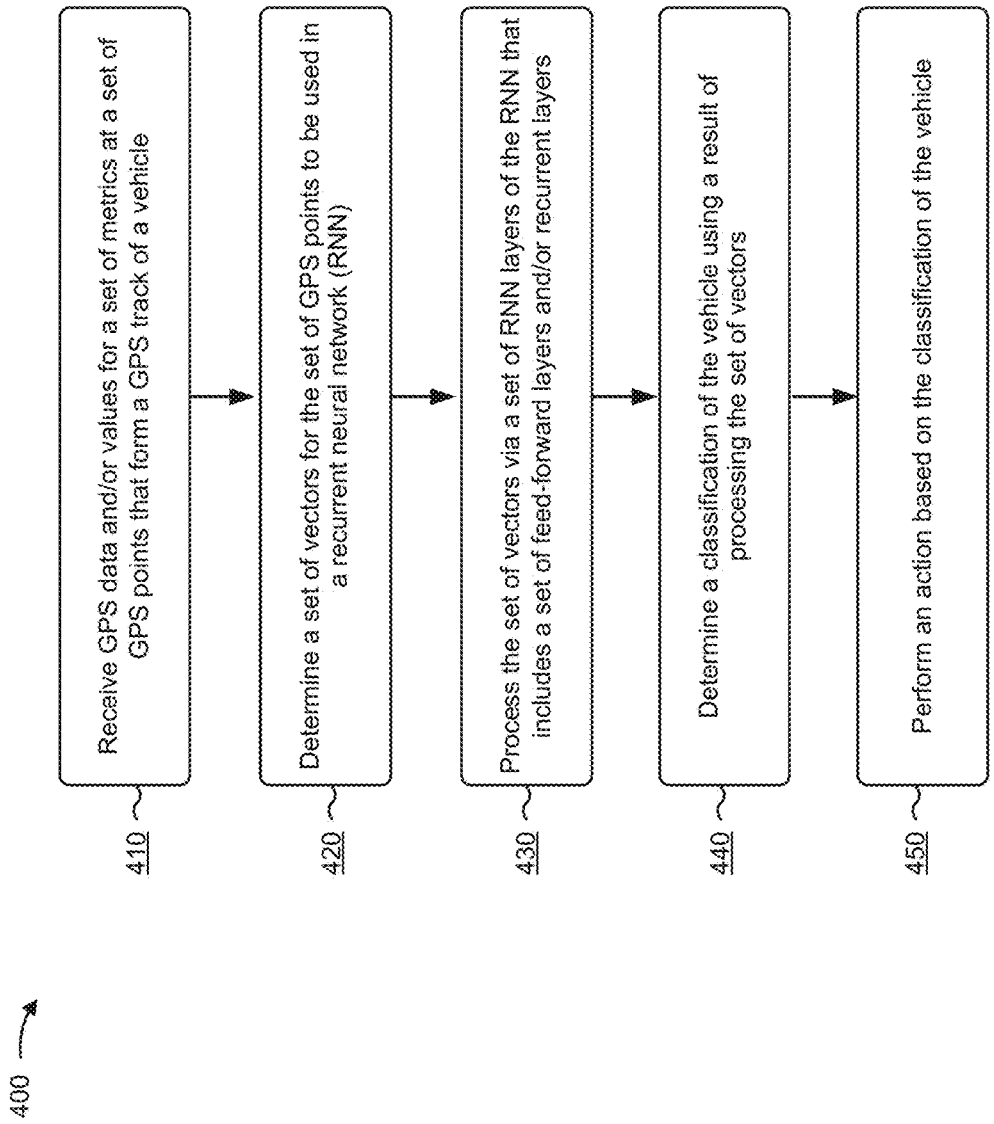

US 10,345,449 B2

VEHICLE CLASSIFICATION USING A RECURRENT NEURAL NETWORK (RNN)

RELATED APPLICATIONS

This application is a continuation-in-part (CIP) of U.S. patent application Ser. No. 15/518,694, filed on Apr. 12, 2017, which was the National Stage of International Application No. PCT/EP2016/079625, filed on Dec. 2, 2016, the contents of which are incorporated by reference herein in their entireties.

BACKGROUND

A recurrent neural network (RNN) can include a type of artificial neural network where connections between units form a directed cycle. This can create an internal state of the RNN which permits the RNN to exhibit dynamic temporal behavior. An RNN can use internal memory to process an arbitrary sequence of inputs. RNNs can be used for such tasks as unsegmented connected handwriting recognition or speech recognition.

BRIEF DESCRIPTION OF THE DRAWINGS

FIG. 4 is a flow chart of an example process for vehicle classification using a recurrent neural network (RNN).

DETAILED DESCRIPTION OF PREFERRED EMBODIMENTS

Figure 1A:
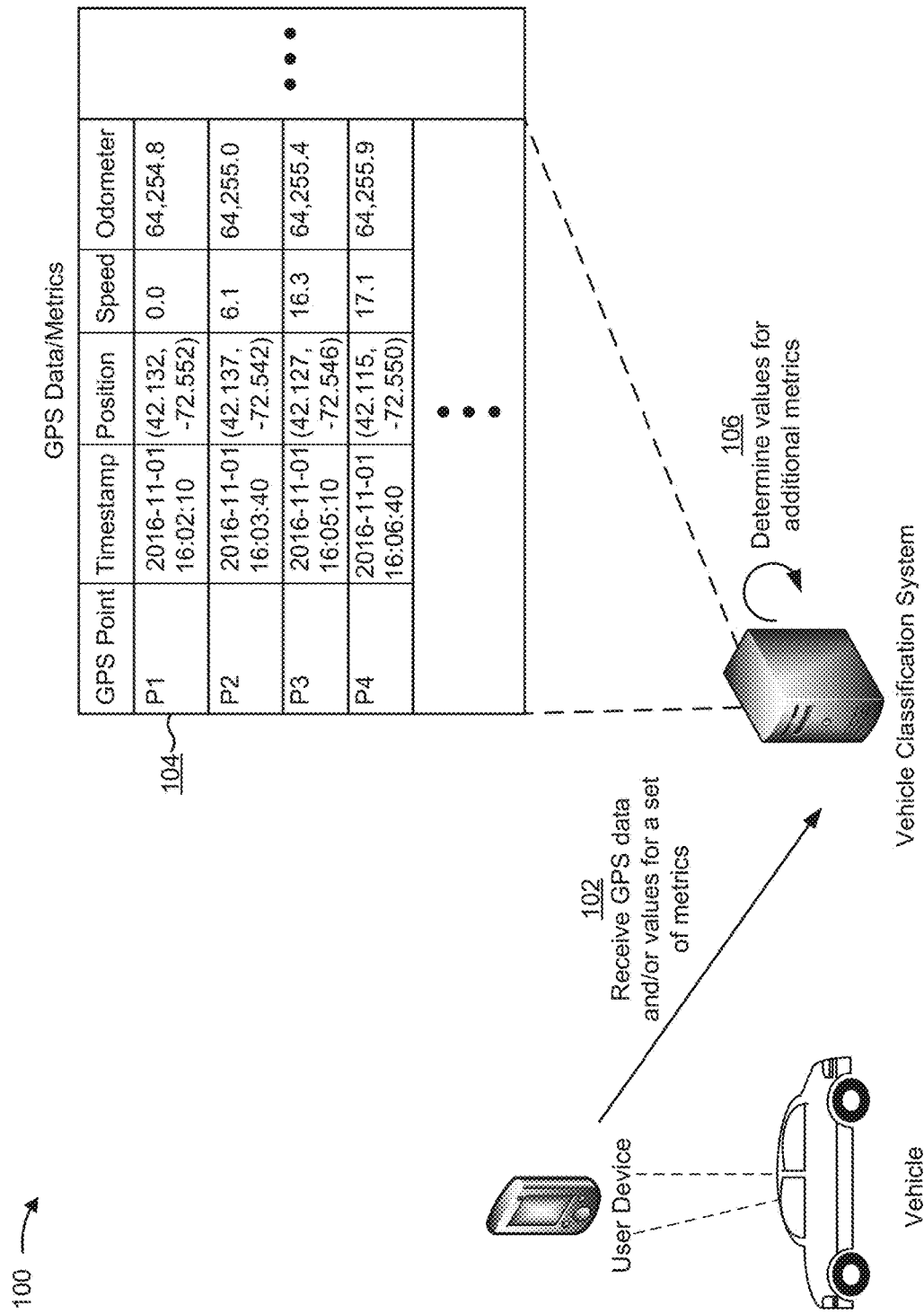
FIGS. 1A-1E are diagrams of an overview of an example implementation described herein.

The following detailed description of example implementations refers to the accompanying drawings. The same reference numbers in different drawings can identify the same or similar elements.

An organization can want to classify vehicles (e.g., on a road) in relation to surveillance, traffic management, emission control, urban planning, and/or the like. The organization can use one or more techniques for classifying vehicles. For example, the organization can install physical components along a road, such as fixed-location sensors, pneumatic tubes, inductive loop detectors, piezoelectric sensors, weigh-in-motion (WIM) systems, infrared sensors, acoustic sensors, radar sensors, and/or the like to obtain various measurements related to vehicles traveling along the road and to classify the vehicles.

This technique can consume significant resources due to high installation costs, equipment requirements, and/or maintenance. In addition, some physical components can fail to provide a threshold amount of accuracy with regard to classifying a vehicle and/or cannot classify vehicles into a threshold quantity of classes (e.g., can only classify vehicles into two classes rather than the 13 classes used by the Federal Highway Administration (FHWA)), such as due to traffic and/or environmental conditions, human error during installation of physical components, and/or the like.

Additionally, or alternatively, and as another example, the organization can use image processing to identify various classes of vehicles in an image and/or video obtained from a camera (e.g., based on a shape, design, etc. of a vehicle in the image and/or video). This technique, however, can fail to provide a threshold accuracy with regard to classifying a vehicle based on a resolution of the camera, vehicles from different classes having similar sizes and/or designs, blur of the image and/or video, lighting of the image and/or video, and/or the like.

Some implementations, described herein, provide a vehicle classification system that is capable of receiving global positioning system (GPS) data and/or values for a set of metrics at a set of GPS points, determining a set of vectors for the set of GPS points, processing the set of vectors via a set of layers of a recurrent neural network (RNN) that includes a set of feed-forward layers and/or recurrent layers, determining a classification of a vehicle associated with the GPS data, and/or performing an action based on the classification. In this way, the vehicle classification system can classify vehicles into a set of classifications (e.g., that can include more than two classifications) using an RNN. This permits the vehicle classification system to more quickly and accurately classify a vehicle relative to other techniques, thereby conserving processing resources associated with classifying a vehicle. In addition, this permits performance of an action based on a more accurate classification of the vehicle relative to other techniques, thereby conserving processing resources that would otherwise have been consumed due to inaccurate classification of the vehicle. Further, this reduces or eliminates a need to install physical devices (e.g., along a road or at specific locations), thereby reducing or eliminating installation and/or maintenance costs associated with the physical devices and/or reducing or eliminating a need for the vehicle to travel by a specific location when being classified.

FIGS. 1A-1E are diagrams of an overview of an example implementation 100 described herein. As shown, implementation 100 can include a vehicle, a user device (e.g., associated with the vehicle), and a vehicle classification system.

As shown in FIG. 1A, and by reference number 102, the vehicle classification system can receive GPS data and/or values for a set of metrics from the user device. For example, the user device can include a smartphone associated with an occupant of the vehicle, a navigation system installed in the vehicle, one or more sensors/devices on or within the vehicle, and/or the like. The vehicle classification system can receive the data, for example, starting when an occupant of the vehicle starts the ignition of the vehicle, as the vehicle travels along a road, and until the occupant turns off the ignition of the vehicle.

The vehicle classification system can receive the GPS data and/or the values at a low frequency (e.g., where the GPS data and/or the values are sampled at an interval of at least 20 seconds, referred to herein as low frequency data). This conserves memory resources by receiving less data (e.g., GPS data and/or values) relative to a high frequency interval, conserves network resources related to receiving data (e.g., bandwidth), conserves processing resources used to receive data, reduces costs related to receiving and/or processing data, and/or the like.

As shown by reference number 104, the GPS data and/or the values of the metrics can be associated with a set of GPS points (e.g., a set of physical locations along a route, or GPS track, of the vehicle). As further shown by reference number 104, the GPS data and/or the values can include data that identifies a timestamp at which the GPS data and/or the values were sampled, a GPS position of each GPS point, a speed at which the vehicle is travelling when at each GPS point, odometer data for the vehicle at each GPS point, and/or the like.

As shown by reference number 106, the vehicle classification system can determine values for additional metrics. For example, the vehicle classification system can determine the additional values using the GPS data and/or the values for the set of metrics received from the user device. Continuing with the previous example, the vehicle classification system can determine a distance (e.g., a crow's flight distance) that the vehicle has traveled between two GPS points, an interval speed of the vehicle between GPS points, an acceleration of the vehicle, an interval acceleration of the vehicle between GPS points, a difference in time between consecutive timestamps, a road type of a road on which the vehicle is traveling (e.g., when the vehicle is a motor vehicle, such as a motorcycle, a car, a truck, a bus, etc.), and/or the like.

In some cases, the vehicle classification system can communicate with a server device (not shown) to determine the values for the additional metrics. For example, the vehicle classification system can provide information identifying a GPS position of the vehicle to the server device and can receive information that identifies a type of road on which the vehicle is traveling.

Figure 1B:
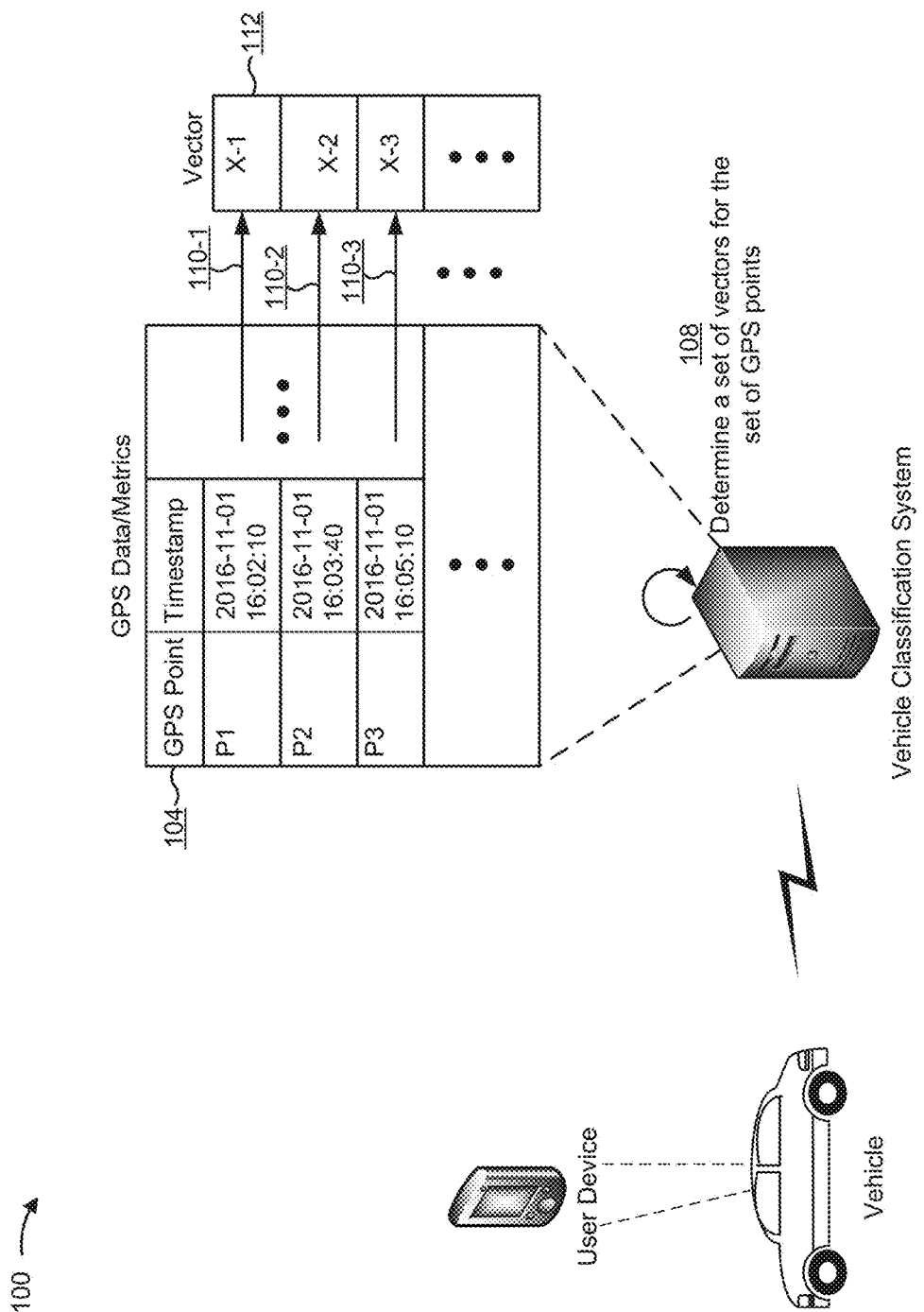

As shown in FIG. 1B, and by reference number 108, the vehicle classification system can determine a set of vectors for the set of GPS points. For example, the vehicle classification system can determine a vector that is based on the GPS data and/or the values for the set of metrics or additional metrics associated with each GPS point. For example, as shown by reference numbers 110-1 through 110-3, the vehicle classification system can determine vectors for GPS points P1 through P3. Continuing with the previous example, and as shown by reference number 112, the vehicle classification system can determine vectors X-1 through X-3 for GPS points P1 through P3, respectively. A vector can include a numerical representation of GPS data and/or the values for the set of metrics or additional metrics associated with each GPS point.

Figure 1C:
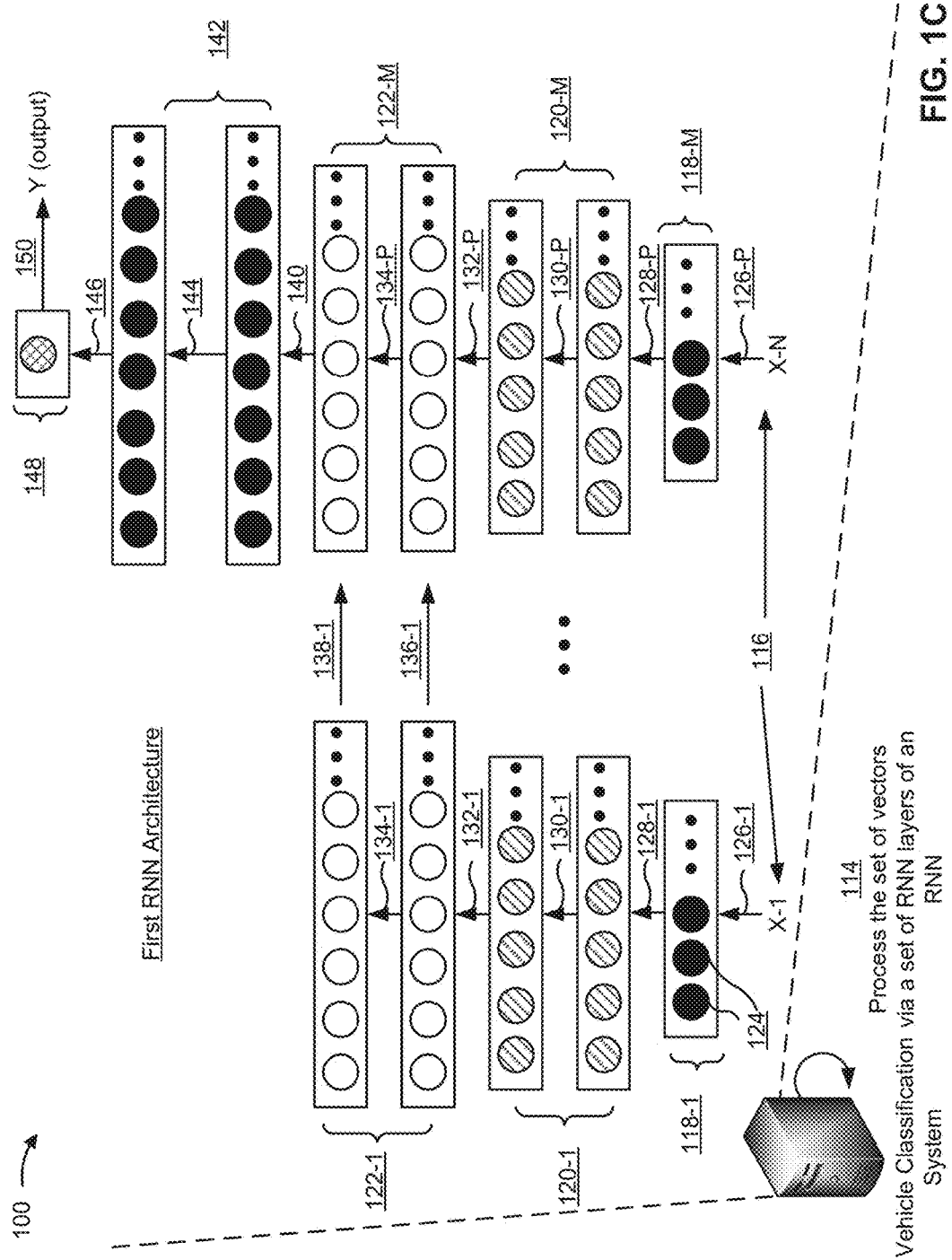

As shown in FIG. 1C, and by reference number 114, the vehicle classification system can process the set of vectors via a set of RNN layers of an RNN. The vehicle classification system can use one or more RNN architectures to process the set of vectors. For example, FIG. 1C shows a first RNN architecture that the vehicle classification system can use to process the set of vectors (e.g., that does not include use of pooling across time).

As shown by reference number 116, when processing the set of vectors (e.g., shown as vectors X-1 through X-N, where N≥1), the vehicle classification system can input each vector into a corresponding set of RNN layers. For example, as shown by reference numbers 118-1 through 118-M (M≥1), each set of RNN layers can include an input layer to receive a vector. In addition, and as shown by reference numbers 120-1 through 120-M, each set of RNN layers can include one or more feed forward layers (e.g., one or more fully-connected pre-processing layers).

In addition, and as shown by reference numbers 122-1 through 122-M, each set of RNN layers can include one or more recurrent layers (e.g., one or more long short-term memory (LSTM) layers). In this way, using an RNN with multiple stacked layers (e.g., of non-linear processing neurons), can permit the RNN to automatically learn hierarchical representations in raw data. For example, the first layers of the RNN, such as the set of feed forward layers shown by reference numbers 118-1 through 118-M, can extract coarse and basic features of a vector, and other layers of the RNN, such as the layers shown by reference numbers 120-1 through 120-M and 142 (described below), extract granular and complex features.

As shown by reference number 124, each layer of the set of RNN layers can include a set of neurons (e.g., artificial neurons) that receive a vector as input and perform a mathematical function on the input to generate an output, as described in more detail elsewhere herein. The quantity of neurons associated with each RNN layer can vary based on a quantity of features to be extracted from the input at each layer, a quantity of potential classes into which the vehicle classification system can classify a vehicle at each layer, and/or the like.

As shown by reference numbers 126-1 through 126-P (P≥1), when processing the set of vectors, the vehicle classification system can input vectors X-1 through X-N into neurons associated with the input layer of the corresponding sets of RNN layers. The neurons of the input layer of each set of RNN layers can receive a vector and can format the vector, normalize the vector, and/or the like. For example, the received GPS data and/or metrics can be in different formats and the vehicle classification system can normalize the GPS data and/or the metrics. Continuing with the previous example, the vehicle classification system can change a format of the data, such as by normalizing a quantity of decimal places used for the GPS data and/or values, can convert data from one format to another, such as by converting GPS data and/or values from meters per second to feet per second, and/or the like.

As shown by reference numbers 128-1 through 128-P, the input layer of each set of RNN layers can provide the vector to a first feed forward layer. The neurons associated with the first feed forward layer can extract a first set of features of the vector associated with classifying a vehicle and/or can determine a classification of a vehicle.

As shown by reference numbers 130-1 through 130-P, the first feed forward layer of each set of RNN layers can provide an output of extracting the first set of features to a second feed forward layer. The neurons associated with the second feed forward layer can extract a second set of features associated with classifying the vehicle based on the first set of features that the first feed forward layer extracted and/or can determine a classification of a vehicle.

As shown by reference numbers 132-1 through 132-P, the second feed forward layer of each of the sets of RNN layers can provide output of extracting the second set of features to a first recurrent layer of each set of RNN layers. The neurons associated with the first recurrent layer can extract a third set of features associated with classifying the vehicle and/or can determine a classification of the vehicle. As shown by reference numbers 134-1 through 134-P, the first recurrent layer can provide output of extracting the third set of features and/or information identifying a vehicle classification to a second recurrent layer. The neurons associated with the second recurrent layer can extract a fourth set of features associated with classifying the vehicle and/or can determine a classification of the vehicle.

As shown by reference number 136-1, the first recurrent layer associated with a first set of RNN layers can provide output to a corresponding first recurrent layer associated with another set of RNN layers. For example, a first recurrent layer associated with a first set of RNN layers can provide output to a first recurrent layer associated with a second set of RNN layers, the first recurrent layer associated with the second set of RNN layers can provide output to a first recurrent layer associated with a third set of RNN layers, and so forth until a first recurrent layer associated with an M−1 set of RNN layers provides output to a first set of recurrent layers associated with an M set of RNN layers (e.g., a first recurrent layer associated with reference number 122-M).

As shown by reference number 138-1, a second recurrent layer associated with a first set of RNN layers can provide output to a second recurrent layer associated with a second set of RNN layers in a similar manner. In this way, recurrent layers associated with various sets of RNN layers can function in a sequential manner where the output of a recurrent layer associated with a first set of RNN layers depends on output from a corresponding recurrent layer associated with a second set of RNN layers (e.g., a recurrent layer associated with a second set of RNN layers that corresponds to a prior GPS point, timestamp, etc.). This permits the vehicle classification system to account for data that indicates different classifications of a vehicle at different times (e.g., a passenger car can be associated with data that is similar to a truck when the car is in traffic).

As shown by reference number 140, the final set of RNN layers of the first RNN architecture can provide output to one or more additional layers not included in the other sets of RNN layers. For example, and as shown by reference number 142, the one or more additional layers can include one or more additional feed forward layers (e.g., fully-connected post-processing layers). The neurons of the additional feed forward layers can determine additional classifications of the vehicle and/or can extract additional sets of features (e.g., based on an accumulation of output from recurrent layers associated with other sets of RNN layers). As shown by reference number 144, a first additional feed forward layer can provide output from determining a classification of the vehicle and/or extracting a fifth set of features to a second additional feed forward layer, which can perform similar functions as the first additional feed forward layer (e.g., determine a classification of the vehicle and/or extract a sixth set of features).

As shown by reference number 146, the second additional feed forward layer can provide output to another layer of the set of RNN layers. For example, as shown by reference number 148, the second additional feed forward layer can provide output to an output layer. The output layer can determine a final classification of the vehicle. As shown by reference number 150, the output layer can output information identifying the classification of the vehicle. In this way, the vehicle classification system can process the set of vectors via a set of RNN layers of an RNN using a first RNN architecture that does not include pooling.

Figure 1D:
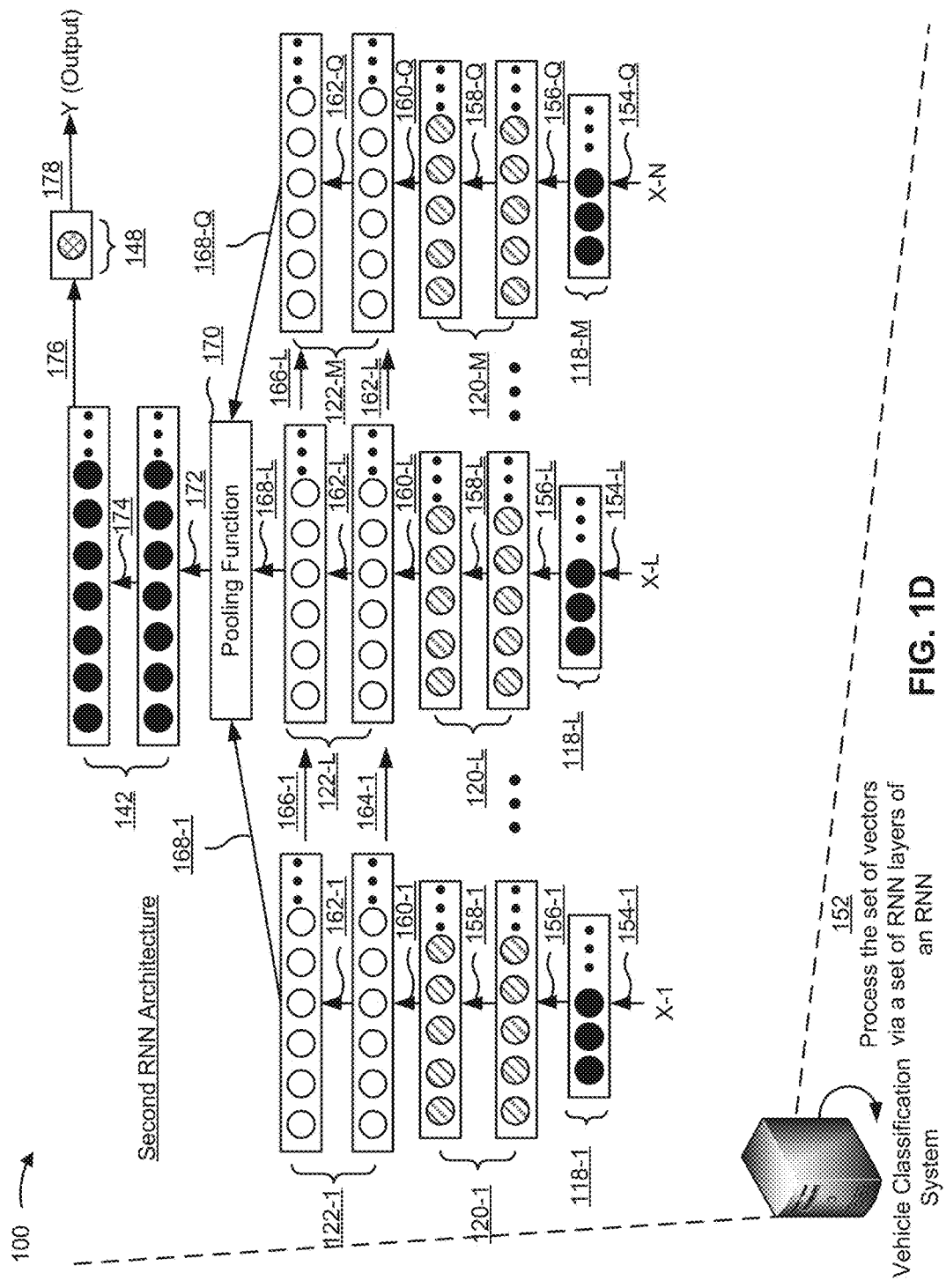

As shown in FIG. 1D, and by reference number 152, the vehicle classification system can process the set of vectors via a set of RNN layers of an RNN. For example, the vehicle classification system can process the set of vectors using a second RNN architecture that includes pooling via use of a pooling function. As shown, the second RNN architecture can include RNN layers similar to the first RNN architecture (e.g., as shown by reference numbers 118 through 122, and 142).

The vehicle classification system can process the set of vectors using the RNN layers shown by reference numbers 118 through 122, and 142, in a manner similar to that described above with respect to the first RNN architecture. For example, the vehicle classification system can receive and process vectors (as shown by reference numbers 154-1 through 154-L (e.g., where L≥1) and 154-L through 154-Q (e.g., where Q≥L)) in a manner similar to that described with respect to reference numbers 126-1 through 126-P. Similarly, and as another example, the vehicle classification system can perform actions shown by reference numbers 156 (e.g., 156-1 through 156-L and 156-L through 156-Q) through 166 (e.g., 166-1 through 166-L) in a manner similar to actions described above with respect to reference numbers 128 (e.g., 128-1 through 128-P) through 138 (e.g., 138-1 through 138-P).

As shown by reference numbers 168-1 through 168-L and 168-L through 168-Q, the second recurrent layers of each set of RNN layers can provide output to a pooling layer 170 rather than providing the output to one or more additional feed forward layers (e.g., shown by reference number 142 and as was the case with respect to the first RNN architecture). Pooling layer 170 can use a pooling function (e.g., an average pooling function or a max pooling function) to pool output from the second recurrent layer associated with each set of RNN layers included in the second RNN architecture. In this way, the vehicle classification system uses pooling (e.g., one dimensional pooling) in an RNN to analyze the whole history of outputs from recurrent layers of each of the sets of RNN layers rather than generating a single output from the last set of RNN layers that is an accumulation of output from recurrent layers associated with each set of RNN layers (e.g., as was the case with the first RNN architecture).

As shown by reference number 172, pooling layer 170 can provide output to additional feed forward layers (e.g., additional feed forward layers that are similar to the additional feed forward layers described above with respect to the first RNN architecture). For example, pooling layer 170 can provide information identifying a classification of a vehicle or a set of extracted features associated with classifying a vehicle to an additional feed forward layer. The additional feed forward layer can function in a manner similar to that described above with respect to the first RNN architecture. The vehicle classification system can perform actions shown by reference numbers 174 through 178 in a manner similar to actions described above with respect to reference numbers 144 through 150, respectively.

Figure 1E:
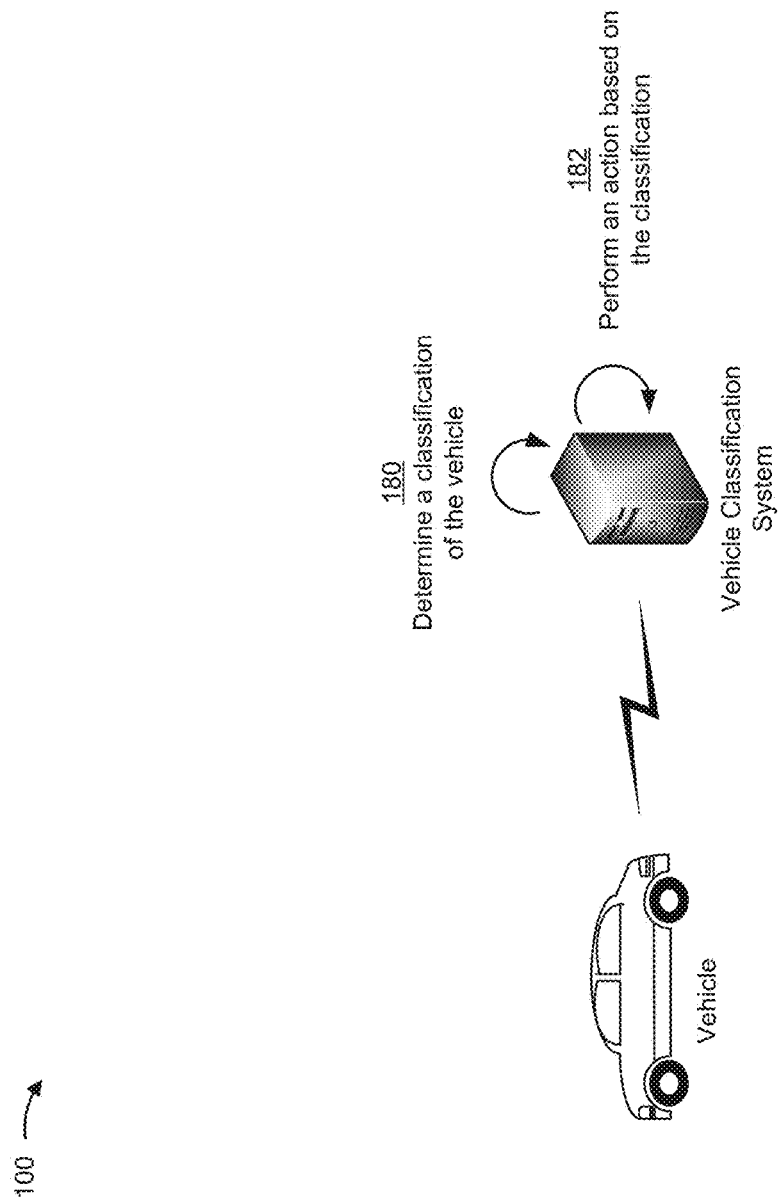

As shown in FIG. 1E, and by reference number 180, the vehicle classification system can determine a classification of the vehicle (e.g., passenger car, bus, truck, light-duty truck, heavy-duty truck, sport utility vehicle (SUV), etc.). For example, the vehicle classification system can determine the classification of the vehicle as a passenger car. As shown by reference number 182, the vehicle classification system can perform an action based on determining the classification. For example, the vehicle classification system can provide the information to a regulatory or government organization. Additionally, or alternatively, and as another example, the vehicle classification system can record metrics related to the vehicle and can aggregate metrics by classification. Additionally, or alternatively, and as another example, the vehicle classification system can send a set of instructions to the user device based on the classification (e.g., to use a different type of road to avoid traffic, to travel at a particular speed, etc.).

In this way, a vehicle classification system can classify vehicles into a set of classifications (e.g., that can include more than two classifications) using an RNN. This permits the vehicle classification system to more quickly and accurately classify a vehicle relative to other techniques, thereby conserving processing resources. In addition, this permits performance of an action based on a more accurate classification relative to other techniques, thereby conserving processing resources that would otherwise have been consumed due to inaccurate classification of the vehicle.

As indicated above, FIGS. 1A-1E are provided merely as an example. Other examples are possible and can differ from what was described with regard to FIGS. 1A-1E. Although FIGS. 1A-1E were described with respect to classifying a motor vehicle, the implementations apply equally to other types of vehicles (e.g., watercraft, aircraft, etc.).

Figure 2:
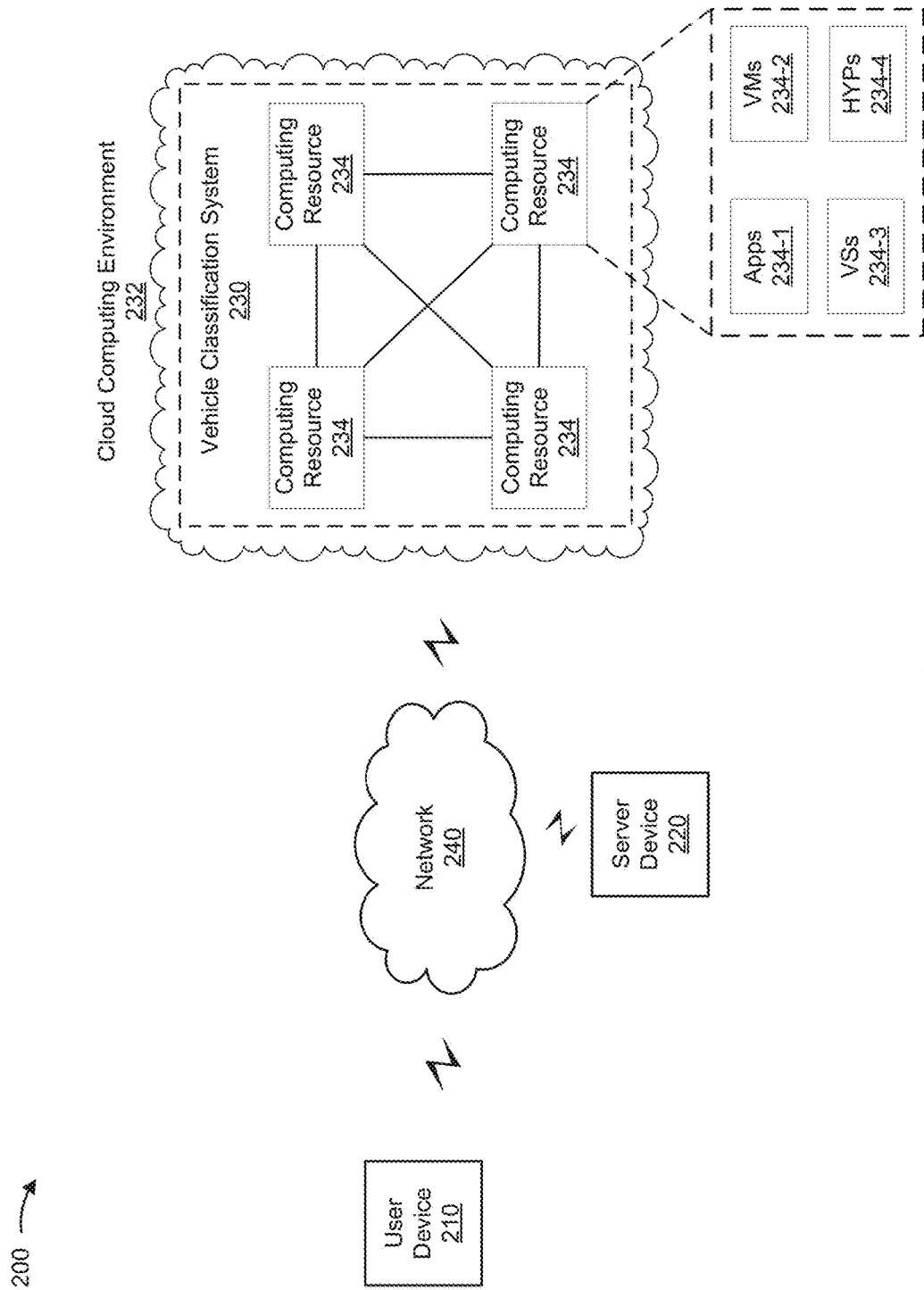
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include user device 210, server device 220, vehicle classification system 230, cloud computing environment 232, and a set of computing resources 234. Devices of environment 200 can interconnect via wired connections, wireless connections, or a combination of wired and wireless connections.

User device 210 includes one or more devices capable of receiving, generating, storing, processing, and/or providing information associated with a vehicle. For example, user device 210 can include a mobile phone (e.g., a smart phone or a radiotelephone), a laptop computer, a tablet computer, a gaming device, a wearable communication device (e.g., a smart wristwatch or a pair of smart eyeglasses), a navigation device (e.g., a global positioning system (GPS) navigation device), one or more sensors capable of capturing information relating to the vehicle, and/or a similar type of device. In some implementations, user device 210 can receive a request for data associated with a vehicle, as described elsewhere herein. Additionally, or alternatively, user device 210 can provide data associated with a vehicle to vehicle classification system 230, as described elsewhere herein. In some implementations, user device 210 can be associated with an autonomous vehicle (e.g., an unmanned aerial vehicle (UAV)), as described elsewhere herein. While a single user device 210 is shown in FIG. 2, in practice, there can be hundreds, thousands, millions, etc. of user devices 210 in communication with vehicle classification system 230.

Server device 220 includes one or more devices capable of receiving, generating, storing, processing, and/or providing information associated with a vehicle. For example, server device 220 can include a server (e.g., in a data center or a cloud computing environment), a data center (e.g., a multi-server micro data center), a workstation computer, a virtual machine (VM) provided in a cloud computing environment, or a similar type of device. In some implementations, server device 220 can provide, to vehicle classification system 230, information related to a vehicle, as described elsewhere herein. Additionally, or alternatively, server device 220 can store information related to a vehicle (e.g., to facilitate analysis of the information), as described elsewhere herein. While a single server device 220 is shown in FIG. 2, in practice, there can be hundreds, thousands, millions, etc. of server devices 220 in communication with vehicle classification system 230.

Vehicle classification system 230 includes one or more devices capable of analyzing data related to a vehicle and classifying the vehicle using an RNN. For example, vehicle classification system 230 can include a cloud server or a group of cloud servers. In some implementations, vehicle classification system 230 can be designed to be modular such that certain software components can be swapped in or out depending on a particular need. As such, vehicle classification system 230 can be easily and/or quickly reconfigured for different uses.

In some implementations, as shown, vehicle classification system 230 can be hosted in cloud computing environment 232. Notably, while implementations described herein describe vehicle classification system 230 as being hosted in cloud computing environment 232, in some implementations, vehicle classification system 230 cannot be cloud-based (i.e., can be implemented outside of a cloud computing environment) or can be partially cloud-based.

Cloud computing environment 232 includes an environment that hosts vehicle classification system 230. Cloud computing environment 232 can provide computation, software, data access, storage, and/or other services that do not require end-user knowledge of a physical location and configuration of a system and/or a device that hosts vehicle classification system 230. As shown, cloud computing environment 232 can include a group of computing resources 234 (referred to collectively as "computing resources 234" and individually as "computing resource 234").

Computing resource 234 includes one or more personal computers, workstation computers, server devices, or another type of device. In some implementations, computing resource 234 can host vehicle classification system 230. The cloud resources can include compute instances executing in computing resource 234, storage devices provided in computing resource 234, data transfer devices provided by computing resource 234, etc. In some implementations, computing resource 234 can communicate with other computing resources 234 via wired connections, wireless connections, or a combination of wired and wireless connections.

As further shown in FIG. 2, computing resource 234 can include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that can be provided to or accessed by one or more devices of environment 200. Application 234-1 can eliminate a need to install and execute the software applications on devices of environment 200. For example, application 234-1 can include software associated with vehicle classification system 230 and/or any other software capable of being provided via cloud computing environment 232. In some implementations, one application 234-1 can send/receive information to/from one or more other applications 234-1, via virtual machine 234-2.

Virtual machine 234-2 includes a software implementation of a machine (e.g., a computer) that executes programs like a physical machine. Virtual machine 234-2 can be either a system virtual machine or a process virtual machine, depending upon use and degree of correspondence to any real machine by virtual machine 234-2. A system virtual machine can provide a complete system platform that supports execution of a complete operating system ("OS"). A process virtual machine can execute a single program, and can support a single process. In some implementations, virtual machine 234-2 can execute on behalf of a user (e.g., a user of user device 210), and can manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 can present a virtual operating platform to the guest operating systems, and can manage the execution of the guest operating systems. Multiple instances of a variety of operating systems can share virtualized hardware resources.

Network 240 includes one or more wired and/or wireless networks. For example, network 240 can include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
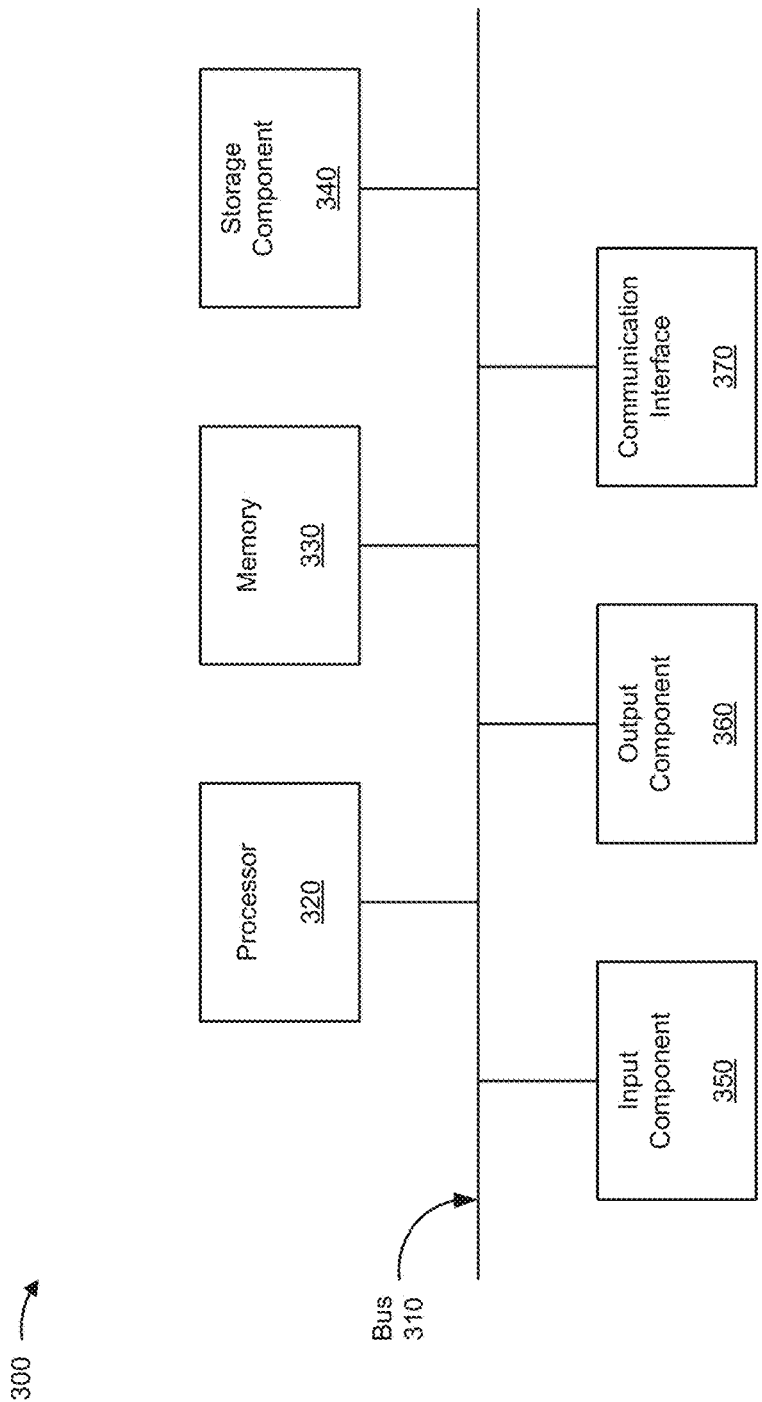
FIG. 3 is a diagram of example components of one or more devices of FIG. 2.

FIG. 3 is a diagram of example components of a device 300. Device 300 can correspond to user device 210, server device 220, and/or vehicle classification system 230. In some implementations, user device 210, server device 220, and/or vehicle classification system 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for vehicle classification using a recurrent neural network (RNN). In some implementations, one or more process blocks of FIG. 4 can be performed by vehicle classification system 230. In some implementations, one or more process blocks of FIG. 4 can be performed by another device or a group of devices separate from or including vehicle classification system 230, such as user device 210 and/or server device 220.

As shown in FIG. 4, process 400 can include receiving GPS data and/or values for a set of metrics at a set of GPS points that form a GPS track of a vehicle (block 410). For example, vehicle classification system 230 can receive GPS data and/or values for a set of metrics at a set of GPS points that form a GPS track of a vehicle. In some implementations, vehicle classification system 230 can receive the GPS data and/or the values from user device 210 periodically, according to a schedule, based on requesting the GPS data and/or the values, based on input from a user of user device 210, and/or the like.

In some implementations, user device 210 and/or vehicle classification system 230 can sample the GPS data and/or the values at an interval. For example, user device 210 and/or vehicle classification system 230 can sample the values at a low frequency interval (e.g., an interval of at least 20 seconds between samplings). This conserves memory resources by receiving less data relative to a high frequency interval, conserves network resources related to receiving data (e.g., bandwidth), conserves processing resources used to receive data, reduces costs related to receiving and/or processing data, and/or the like.

In some implementations, a vehicle can include a mobile machine (e.g., that transports people and/or cargo). For example, a vehicle can include a motor vehicle (e.g., a motorcycle, a bus, a car, etc.), a railed vehicle (e.g., a train or a tram), a watercraft (e.g., a ship, a boat, a submarine, etc.), an aircraft (e.g., a plane, a glider, or a UAV), a spacecraft, an electric vehicle (e.g., an electric car), a moped, a scooter, a bicycle, and/or the like. In some implementations, a vehicle can include an autonomous vehicle, such as an autonomous car, an autonomous boat, and/or the like.

In some implementations, a GPS point can include a physical location where GPS data and/or values for a set of metrics are obtained. In some implementations, a GPS track can identify a route via which a vehicle traveled. For example, a GPS track can include a set of GPS points (e.g., where the set of GPS points identify the route of a vehicle). In some implementations, vehicle classification system 230 can receive GPS data and/or values for a set of metrics when a vehicle's ignition starts and until the vehicle's ignition has been turned off (e.g., as detected by user device 210 when user device 210 is installed on the vehicle). Additionally, or alternatively, vehicle classification system 230 can receive GPS data and/or values when a vehicle starts moving and until the vehicle stops moving (e.g., for more than a threshold amount of time).

In some implementations, GPS data can include data elements related to a physical location of a vehicle (e.g., a physical location of user device 210 associated with the vehicle). For example, GPS data can identify a latitude, a longitude, a city, a country, and/or the like for a location of user device 210. In some implementations, a set of metrics for which vehicle classification system 230 receives values can include total odometer distance at a GPS point, trip distance (e.g., odometer distance of a GPS track), a timestamp (e.g., at which GPS data and/or values for the set of metrics were obtained), a speed of a vehicle when GPS data and/or values were obtained, and/or the like.

In some implementations, vehicle classification system 230 can determine values for other metrics (e.g., using the received GPS data and/or the values for the metrics). For example, vehicle classification system 230 can determine an interval speed between two GPS points, an acceleration at a particular GPS point, an interval acceleration between two GPS points, a distance traveled (e.g., a crow's flight distance) between two GPS points, a road type of a road on which the vehicle is traveling (e.g., when the vehicle is a motor vehicle), and/or the like.

In some implementations, vehicle classification system 230 can determine an interval speed by determining a difference in speed between two GPS points over time. For example, vehicle classification system 230 can use the equation:

$$k_i = \frac{o_i - o_{i-1}}{t_i - t_{i-1}} \quad (1)$$

In equation 1, the term $k_i$ can represent an interval speed of a vehicle at GPS point i, the term $o_i - o_{i-1}$ can represent a difference between odometer readings at GPS points i and i−1, and the term $t_i - t_{i-1}$ can represent a difference between timestamps at GPS points i and i−1.

In some implementations, vehicle classification system 230 can determine an acceleration by determining a difference between instantaneous speeds at two GPS points. For example, vehicle classification system 230 can use the equation:

$$a_i = \frac{v_i - v_{i-1}}{t_i - t_{i-1}} \quad (2)$$

In equation 2, the term $a_i$ can represent an acceleration of a vehicle at GPS point i, the term $v_i$, $v_{i-1}$ can represent a difference between instantaneous speed at GPS points i and i−1, and the term $t_i - t_{i-1}$ can represent a difference between timestamps at GPS points i and i−1.

In some implementations, vehicle classification system 230 can determine an interval acceleration by determining a difference between average speeds at two GPS points. For example, vehicle classification system 230 can use the equation:

$$l_i = \frac{k_i - k_{i-1}}{t_i - t_{i-1}} \quad (3)$$

In equation 3, the term $l_i$ can represent an interval acceleration of a vehicle at GPS point i, the term $k_i - k_{i-1}$ can represent a difference between instantaneous speed at GPS points i and i−1, and the term $t_i - t_{i-1}$ can represent a difference between timestamps at GPS points i and i−1.

In some implementations, vehicle classification system 230 can determine a Haversine distance (e.g., a crow's flight distance) between two GPS points. For example, vehicle classification system 230 can determine the Haversine distance using a Haversine formula. In some implementations, a Haversine formula can be represented by an equation:

$$2R \times \arcsin\left(\sqrt{\sin^2\left(\frac{lat_2 - lat_1}{2}\right) + \cos(lat_1) \times \cos(lat_2) \times \sin^2\left(\frac{lon_2 - lon_1}{2}\right)}\right) \quad (4)$$

In equation 4, the term R can represent the average earth radius (e.g., 6,371 kilometers (KM)), the terms $lat_1$ and $lon_1$ can represent latitude and longitude coordinates, respectively, at a first GPS point (e.g., expressed in radians), and $lat_2$ and $lon_2$ can represent latitude and longitude coordinates, respectively, at a second GPS point (e.g., expressed in radians).

In some implementations, vehicle classification system 230 can determine the Haversine distance to determine an amount of winding a road has (e.g., by determining whether a difference between a total odometer distance and a Haversine distance of a GPS track satisfies a threshold, whether ratio of a total odometer distance and a Haversine distance satisfies a threshold, etc.). In some implementations, vehicle classification system 230 can use this determination when determining a classification for a vehicle (e.g., by accounting for an impact that an amount that a road winds can have on GPS data and/or determined or received values).

In some implementations, vehicle classification system 230 can determine a road type on which a vehicle is traveling (e.g., when analyzing data related to a motor vehicle). For example, a road type can include motorway, highway, trunk road, country road, city road, residential road, and/or another type of road. Continuing with the previous example, the different types of roads can be based on different posted speed limits, different locations, different quantities of lanes, whether divided or undivided, a construction material, and/or the like.

In some implementations, vehicle classification system 230 can determine the road type using information stored by server device 220. For example, vehicle classification system 230 can perform a reverse look up of GPS data (e.g., longitude and latitude data) of a vehicle using a data structure stored by server device 220 (e.g., a data structure that includes GPS data and information identifying corresponding road types) to determine a road type of the road on which the vehicle is traveling. Continuing with the previous example, server device 220 can provide road type information as a service (e.g., like Open-StreetMap).

In some implementations, vehicle classification system 230 can avoid aggregating GPS data and/or values (e.g., determined or received values) related to a vehicle. For example, vehicle classification system 230 can avoid determining a total distance traveled by the vehicle along a GPS track. Additionally, or alternatively, vehicle classification system 230 can avoid otherwise processing GPS data and/or values related to a vehicle. For example, vehicle classification system 230 can avoid normalizing GPS data and/or values that were measured at different sampling rates. In this way, vehicle classification system 230 can use raw data from user device 210. This conserves processing resources that would otherwise be used to aggregate and/or process GPS data and/or values. In addition, this improves an efficiency of classifying a vehicle by reducing an amount of time needed to classify the vehicle.

In some implementations, vehicle classification system 230 can receive other types of data. For example, vehicle classification system 230 can receive weather data that identifies weather conditions along a GPS track, traffic data that identifies traffic conditions along a GPS track, altitude data that identifies altitude changes of a vehicle (e.g., for determining a grade of travel of the vehicle), revolutions per minute data related to engine cycles of a vehicle, accelerometer data, and/or the like. In some implementations, vehicle classification system 230 can use the other types of data to contextualize GPS data and/or values, so as to determine when a vehicle's GPS data and/or values are not normal (e.g., GPS data and/or values for a passenger car can be similar to a heavy duty truck when the passenger car is traveling in heavy traffic). This improves an accuracy of a classification of a vehicle and conserves processing resources that would otherwise have been used to erroneously determine a classification of a vehicle.

In this way, vehicle classification system 230 can receive GPS data and/or values for a set of metrics at a set of GPS points that form a GPS track of a vehicle to determine a set of vectors for the set of GPS points using the GPS data and/or the values for the set of metrics.

As further shown in FIG. 4, process 400 can include determining a set of vectors for the set of GPS points to be used in a recurrent neural network (RNN) (block 420). For example, vehicle classification system 230 can determine a set of vectors for the set of GPS points to be used in an RNN.

In some implementations, an RNN can include a class of artificial neural networks where connections between units form a directed cycle (e.g., to create an internal state of the RNN which allows the RNN to exhibit dynamic temporal behavior). For example, an RNN can include a subclass of neural networks that contain one or more recurring elements (e.g., a link that connects a layer of the RNN back to the same layer, a link that connects a layer in a first set of RNN layers of the RNN to a layer included in a second set of RNN layers of the RNN, etc.). In some implementations, an RNN can include various types of layers. For example, an RNN can include an input layer that receives a vector as input, an output layer that provides information indicating a result of processing a vector via the RNN (e.g., a classification of a vehicle, a fixed-length vector, etc.), and/or a set of hidden layers that process input into the RNN.

In some implementations, a recurrent hidden layer can be represented by an equation:

$$h_t = \sigma(W[x^t, h^{t-1}] + b) \qquad (5)$$

In equation 5, the term $h^t$ can represent a vector output for instance t input (e.g., a classification of a vehicle based on data associated with GPS point t or timestamp t), the term $\sigma$ can represent an activation function, as described in more detail elsewhere herein, the term W can represent a matrix of weights that the recurrent hidden layers of the RNN use, the term $x^t$ can represent a vector that is input into the RNN (e.g., a vector of data associated with GPS point t or timestamp t), the term $h^{t-1}$ can represent a vector output for a prior set of RNN layers of the RNN (e.g., a vehicle classification based on data associated with GPS point t−1 or timestamp t−1), and the term b can represent a bias that the hidden recurrent layers apply when processing input. In some implementations, $h^t$ can include a fixed-length vector (e.g., to account for vehicle classification being a sequence-to-one classification problem).

In some implementations, a vector can include a numerical representation of data associated with a vehicle. For example, a vector can include a numerical representation of GPS data received from a vehicle, values for a set of metrics received from the vehicle, additional values for additional metrics that vehicle classification system 230 determined, and/or the like. Additionally, or alternatively, a vector can include a feature vector. For example, a vector can include an n-dimensional vector of numerical features that represent a vehicle. Continuing with the previous example, a vector can be represented by an equation:

$$x = [x_1, \ldots, x_m] \qquad (6)$$

In equation 6, the term x can represent a vector of a set of numerical features $x_1$ through $x_m$, where m≥1. For example, a value for $x_1$ can include information identifying a latitude of a vehicle, a value for $x_2$ can include information identifying a longitude of the vehicle, a value for $x_3$ can include information identifying a speed of the vehicle, and so forth.

In some implementations, when determining a vector, vehicle classification system 230 can construct a vector. For example, vehicle classification system 230 can combine data associated with a vehicle in a manner similar to that shown by equation 6. In some implementations, vehicle classification system 230 can determine a set of vectors for a set of GPS points that form a GPS track. For example, vehicle classification system 230 can determine a set of vectors for a set of GPS points, such that data associated with each GPS point is represented by a separate vector. In some implementations, when generating a vector using information identifying a road type, vehicle classification system 230 can use a set of one-hot bits to identify different road types. In this way, vehicle classification system 230 can use a vector to represent data for various features of a vehicle, a GPS point, and/or the like (e.g., physical location, instantaneous speed, interval acceleration, road type, etc.). In some implementations, vehicle classification system 230 can use a vector as input to an RNN, as described in more detail elsewhere herein.

In some implementations, vehicle classification system 230 can use a vector to train an RNN. For example, vehicle classification system 230 can use a training set of vectors that includes a set of n-dimensional vectors and a set of corresponding identifiers (e.g., a set of labels) that identifies a classification of a vehicle with which the set of vectors is associated to train an RNN.

In this way, vehicle classification system 230 can determine a set of vectors for the set of GPS points to be used in an RNN.

As further shown in FIG. 4, process 400 can include processing the set of vectors via a set of RNN layers of the RNN that includes a set of feed-forward layers and/or recurrent layers (block 430). For example, vehicle classification system 230 can process the set of vectors via a set of RNN layers of the RNN that includes a set of feed-forward layers and/or recurrent layers. In some implementations, vehicle classification system 230 can process the set of vectors based on a request from a user of user device 210 and/or server device 220, based on determining a threshold quantity of vectors, based on a receiving an indication that a GPS track has ended (e.g., that an ignition of a vehicle to be classified has been turned off), and/or the like.

In some implementations, the RNN can include a set of RNN layers. For example, the RNN can include a set of RNN layers that receive input, process the input (e.g., to extract features of the input, to identify a classification of the input, etc.), and generate an output. Continuing with the previous example, the set of RNN layers can receive the set of vectors, process the set of vectors, and output a vector, or other information, that identifies a classification of a vehicle.

In some implementations, the set of RNN layers can include an input layer. For example, an input layer can receive a set of vectors that vehicle classification system 230 determined. In some implementations, an input layer can process a set of vectors to format the set of vectors for use in the RNN, to insert a default value for missing data in a vector (e.g., a feature for which data was not received), and/or the like. In some implementations, vehicle classification system 230 can perform this function prior to inputting the set of vectors to the input layer.

In some implementations, the set of RNN layers can include a set of feed-forward layers. For example, the set of RNN layers can include a set of fully connected pre-processing layers. Additionally, or alternatively, and as another example, the set of feed-forward layers can include a set of fully-connected post-processing layers. In some implementations, a set of feed forward layers (e.g., fully-connected pre-processing layers) can receive a set of vectors from an input layer and can process the set of vectors to extract a set of features from the set of vectors, to determine a vehicle classification, and/or the like. Additionally, or alternatively, a set of feed-forward layers (e.g., fully-connected post-processing layers) can receive output from another set of RNN layers and can process the output to extract a set of features from the output, determine a vehicle classification, and/or the like.

In some implementations, the set of RNN layers can include a set of recurrent layers. For example, a set of recurrent layers can include a set of long short-term memory (LSTM) layers. In some implementations, the set of recurrent layers can receive output and/or information identifying an internal state of another set of RNN layers as input. For example, assume that the RNN includes a set of RNN layers for each timestamp of a GPS track. Continuing with the previous example, a set of recurrent layers of a first set of RNN layers associated with a first timestamp can receive output from a set of fully-connected layers included in the first set of RNN layers and information identifying a state (e.g., a vehicle classification) determined by another set of recurrent layers included in a second set of RNN layers associated with a second timestamp. In this way, an RNN can accumulate output from a set of recurrent layers across multiple sets of RNN layers, thereby improving an accuracy of an output of the RNN.

In some implementations, the set of RNN layers can include an output layer. For example, an output layer can process output from a set of fully-connected post-processing layers and can output a result. Continuing with the previous example, a result can include a vector that identifies a classification of a vehicle (e.g., a fixed-length vector), information that identities a probability that a vehicle is a particular classification of vehicle, an average result of multiple iterations of using the RNN to process the same set of vectors, and/or the like.

In some implementations, the set of RNN layers can include a pooling layer. For example, a pooling layer can receive output from other sets of RNN layers and can pool the output using a pooling function. Continuing with the previous example, a pooling function can include use of average pooling, max pooling, and/or the like. In this way, an RNN can generate an output that is based on a history of outputs from multiple sets of RNN layers, thereby improving an accuracy of the output of the RNN.

In some implementations, each layer can include a set of neurons (e.g., artificial neurons or nodes). For example, the set of neurons can process information (e.g., a vector, output from a layer, etc.) to determine a set of features, to classify a vehicle, etc. In some implementations, a neuron can be represented by an equation:

$$f(x) = \sigma(b + \sum_{i=1}^{m} w_i x_i) \qquad (7)$$

In equation 7, the term f(x) can represent a numeric function that maps a vector of numeric inputs x to a single numeric output, the term σ can represent an activation function (e.g., a non-linear activation function), such as a sigmoid function (e.g., for binary classification), a hyperbolic tangent, a softmax function (e.g., for multiclass classification), an identity function (e.g., for regression), or a rectified linear unit (ReLU), the term b can represent a bias term, and the term $\sum_{i=1}^{m} w_i x_i$ can represent a sum of a product of weight $w_i$ and vector $x_i$ (e.g., a numeric value for a feature included in vector x).

In some implementations, a set of neurons can include a set of LSTM cells. For example, an LSTM cell can provide an output state, an internal cell state, and a set of forget gates, which can be represented by the following set of equations:

$$i^t = \sigma(W_i[x^t, h^{t-1}] + b_i) \quad (8)$$

$$f^t = \sigma(W_f[x^t, h^{t-1}] + b_f) \quad (9)$$

$$o^t = \sigma(W_o[x^t, h^{t-1}] + b_o) \quad (10)$$

$$c'^t = \tan h(W_c[x^t, h^{t-1}] + b_c) \quad (11)$$

$$c^t = f^t c^{t-1} + i^t c'^t \quad (12)$$

$$h^t = o^t \times \tan h(c^t) \quad (13)$$

In equations 8 through 13, the terms $i^t$, $f^t$, and $o^t$ can represent a set of forget gate vectors, the term $c^t$ can represent an internal state vector, the term $c'^t$ can represent a hyperbolic tangent of $c^t$, the term $h^t$ can represent an output state vector, the term $\sigma$ can represent an activation function (e.g., a sigmoid function), the terms $W_i$, $W_f$, $W_o$, and $W_c$ can represent various weights, the terms $b_i$, $b_f$, $b_o$, and $b_c$ can represent various biases, the term $x^t$ can represent an input vector for timestamp t (e.g., a particular GPS point), the term $h^{t-1}$ can represent an output vector a set of RNN layers associated with timestamp t–1 (e.g., a GPS point), which can be the timestamp prior to timestamp t, the term $c^{t-1}$ can represent an internal state vector of a set of RNN layers associated with timestamp t–1, and the term tan h( ) can represent a hyperbolic tangent. In some implementations, use of LSTM cells can permit the RNN to determine whether and/or when to save or delete each component of a cell state, such as to permit elimination of a potentially erroneous classification determination.

In some implementations, the RNN and/or the set of RNN layers can have a particular architecture. For example, the RNN can include multiple sets of RNN layers that correspond to each of the vectors included in the set of vectors (e.g., a set of RNN layers for each GPS point, timestamp for which data was received, etc.). In some implementations, and for a first RNN architecture, each set of RNN layers of the RNN can include an input layer followed by a set of feed-forward layers (e.g., fully-connected pre-processing layers), followed by a set of recurrent layers (e.g., LSTM layers). The last set of RNN layers (e.g., corresponding to the last GPS point in a GPS track or the last timestamp for received data) can include another set of feed forward layers (e.g., fully-connected post-processing layers) followed by an output layer.

In some implementations, in the first architecture, the set of feed-forward layers (e.g., fully-connected pre-processing layers) can operate independently on each vector, applying the same function to extract features of a set of vectors. In some implementations, in the first architecture, the set of recurrent layers can operate in a sequence manner, applying a function that depends on a vector input to an input layer associated with the set of recurrent layers and an output of a set of recurrent layers associated with another set of RNN layers (e.g., associated with the previous GPS point or timestamp).

In this way, vehicle classification system 230 can use the RNN to identify a pattern in data over time. In some implementations, and in the first RNN architecture, the set of recurrent layers of the last set of RNN layers (e.g., associated with the last GPS point in a GPS track) can provide a fixed-length vector that indicates a classification of a vehicle to another set of feed-forward layers (e.g., fully-connected post-processing layers) that process the fixed-length vector using a non-linear activation function. In this way, the RNN uses the output of the last set of recurrent layers, which represents an accumulation of outputs across multiple sets of RNN layers, thereby improving a classification determination.

In some implementations, and for a second RNN architecture, each set of RNN layers can include an input layer, a set of feed forward layers, and/or a set of recurrent layers, similar to that described above with respect to the first RNN architecture. In some implementations, the second RNN architecture can include another set of feed forward layers and an output layer, similar to that described above with respect to the first RNN architecture, however, the second RNN architecture can include a pooling layer between the set of recurrent layers and the other set of feed forward layers (e.g., that implements pooling of output, such as one dimensional pooling).

In some implementations, the pooling layer can receive output from each of the set of recurrent layers included in each of the sets of RNN layers. For example, the set of recurrent layers included in the last set of RNN layers can receive output from prior sets of recurrent layers, in a manner similar to that described with respect to the first RNN architecture, but rather than providing output to the other set of feed forward layers, the set of recurrent layers included in the last set of layers can provide output to a pooling layer. Additionally, in some implementations, each set of recurrent layers included in each set of other RNN layers of the RNN can provide output to the pooling layer.

In some implementations, a pooling layer can use a pooling function on the received output to generate a fixed-length vector, which can then be provided to, and processed by, the other set of feed forward layers and the output layer, in a manner similar to that described above. In this way, output of the RNN can be based on a whole history of outputs from the sets of recurrent layers in the RNN, rather than using accumulated output, as was the case with the first RNN architecture.

In some implementations, vehicle classification system 230 can train the RNN prior to using the RNN to process the set of vectors. For example, vehicle classification system 230 can train the RNN using a training set of vectors (described above) and a set of identifiers that identifies a classification of a vehicle with which the set of vectors is associated. In some implementations, when training the RNN, vehicle classification system 230 can adjust a weight that a neuron uses until an output of the RNN (e.g., a vehicle classification) matches an identifier associated with the training set of vectors. For example, vehicle classification system 230 can iterate a sequence of steps until information identifying a predicted vehicle classification and information indicating an actual classification match (e.g., until convergence).

In some implementations, vehicle classification system 230 can use an error function to perform a comparison of a predicted classification and an actual classification. In some implementations, for each weight used by a set of neurons in an RNN layer, vehicle classification system 230 can determine a gradient of an error of a comparison of a predicted classification and an actual classification (e.g., a partial derivative of the error relative to a particular weight).

In some implementations, vehicle classification system 230 can adjust a weight that a neuron uses according to an equation:

$$w_i^{t+1} = w_i^t - \alpha \frac{\partial e^t}{\partial w_i} \quad (14)$$

In equation 14, the term $w_i^{t+1}$ can represent an adjusted weight, for GPS point i, at iteration t+1, the term $w_i^t$ can represent a particular weight at iteration t, the term $\alpha$ can represent a multiplicative weight (e.g., a time-varying multiplicative weight), such as a learning weight, the term $$\frac{\partial e^t}{\partial w_i}$$

can represent a partial derivative of an error $e^t$ at iteration t relative to a specific weight $w_i$.

In some implementations, when training the RNN, vehicle classification system 230 can use subsets of the training set of vectors (e.g., mini-batches), and can adjust weights based on a gradient of an error associated with each subset. For example, vehicle classification system 230 can use stochastic gradient descent (SGD), an adaptive moment estimation (ADAM) method, and/or the like when adjusting a weight that a neuron uses. This conserves memory resources and increases an efficiency of training the RNN relative to training an RNN without using subsets of the training set of vectors.

In some implementations, when training an RNN, vehicle classification system 230 can use a set of batch normalization layers prior to using an activation function associated with a fully-connected feed forward layer and/or a recurrent layer (e.g., as a regularization technique). This improves training relative to other techniques, such as dropout, by reducing an amount of time needed to train the RNN and/or by reducing overfitting. In addition, this conserves processing resources by reducing or eliminating a need to normalize every dimension of an input vector to a fixed range (e.g., permitting use of raw data regardless of sampling rate, measurement scale, etc.).

In some implementations, vehicle classification system 230 can use a technique when training the RNN to reduce or eliminate vanishing or exploding gradients. In some implementations, vehicle classification system 230 can use gradient clipping, identity initialization with ReLU activations, complex neuron architectures, such as LSTM neurons, and/or the like, when training the RNN. For example, vehicle classification system 230 can use a combination of gradient clipping and an ADAM method to reduce instability in training that can be caused by changes to a set of input vectors. This improves training of the RNN, and thereby improves an output of the RNN when vehicle classification system 230 uses the RNN to process a set of vectors.

In some implementations, vehicle classification system 230 can use a loss function when training the RNN. For example, vehicle classification system 230 can train the RNN such that a loss function is minimized. In some implementations, vehicle classification system 230 can weight a loss function. For example, vehicle classification system 230 can weight a loss function by an inverse of a size of a class of vehicles (e.g., based on vehicle classification system 230 using unbalanced classes that include different quantities of input vectors to train the RNN). This improves training of the RNN via reduced errors, thereby reducing errors and conserving processing resources when the RNN processes a raw data set.

Additionally, or alternatively, vehicle classification system 230 can monitor a balanced accuracy metric, a macro-averaged recall metric, and/or the like when training the RNN. For example, a balanced accuracy metric can be represented by an equation:

$$acc_{bal} = \frac{1}{C} \sum_{c=1}^{c} \frac{TP_c}{N_c} \quad (15)$$

In equation 15, the term C can represent a quantity of possible classifications for a vehicle, the term $TP_c$ can represent a quantity of correctly classified vehicles for classification c, and the term $N_c$ can represent a total quantity of vehicles that belong to classification c (e.g., a quantity of vehicles that have an identifier identifying the vehicles as belonging to classification c). In this way, vehicle classification system 230 can monitor an effectiveness of training for classification that satisfy a threshold and classifications that do not satisfy a threshold. In addition, in this way, vehicle classification system 230 can monitor an effectiveness of training for binary classification models and multi-class classification models.

In some implementations, when training the RNN, vehicle classification system 230 can adjust a quantity of layers included in each set of RNN layers associated with the RNN. For example, vehicle classification system 230 can adjust a quantity of feed forward layers, a quantity of recurrent layers, a quantity of neurons in each layer, and/or the like until a threshold error rate is achieved. This improves training of the RNN and improves output of the RNN when used to process raw data, thereby conserving processing resources that would have been used in relation to erroneous classifications.

In some implementations, vehicle classification system 230 can use particular hardware, libraries, and/or the like when training the RNN. For example, vehicle classification system 230 can use various libraries, such as TensorFlow or Keras (e.g., via a Keras wrapper), GPUs, such as Nvidia K80 GPUs, and/or the like. Continuing with the previous example, vehicle classification system 230 can use hardware, libraries, and/or the like on a cloud instance, such on a p2.xlarge Amazon Web Services (AWS) instance.

In this way, vehicle classification system 230 can process the set of vectors via a set of RNN layers of the RNN, such as to determine a classification of the vehicle, as described below.

As further shown in FIG. 4, process 400 can include determining a classification of the vehicle using a result of processing the set of vectors (block 440). For example, vehicle classification system 230 can determine a classification of the vehicle using a result of processing the set of vectors. In some implementations, vehicle classification system 230 can determine a classification based on completing processing of the set of vectors, processing the set of vectors a threshold quantity of times, receiving an indication from user device 210 to determine a classification, and/or the like.

In some implementations, vehicle classification system 230 can determine a classification based on output from the RNN. For example, vehicle classification system 230 can determine a classification based on a value of a fixed-length vector that an output layer associated with the RNN outputs.

Additionally, or alternatively, vehicle classification system 230 can determine a classification based on a set of probabilities that the vehicle is a particular classification of vehicle. For example, the RNN can output information indicating various probabilities that the vehicle is associated with various classifications. Continuing with the previous example, vehicle classification system 230 can determine a classification of the vehicle by selecting the classification with the highest probability relative to other classifications, selecting a classification with a probability that satisfies a threshold, and/or the like. In some implementations, when multiple probabilities satisfy a threshold, vehicle classification system 230 can eliminate from consideration, classifications that are not associated with probabilities that satisfy the threshold, and can re-process the set of vectors using a reduced set of possible classifications.

In some implementations, vehicle classification system 230 can process the set of vectors multiple times. For example, vehicle classification system 230 can process the set of vectors multiple times using different quantities of layers and/or neurons, different weights, different sets of classifications, and/or the like. In some implementations, vehicle classification system 230 can determine a classification based on multiple results of processing the set of vectors multiple times. For example, vehicle classification system 230 can determine an average result of processing the set of vectors multiple times, a classification indicated a higher quantity of times relative to other classifications, and/or the like.

In this way, vehicle classification system 230 can determine a classification of the vehicle using a result of processing the set of vectors, such as to permit performance of an action, as described below.

As further shown in FIG. 4, process 400 can include, performing an action based on the classification of the vehicle (block 450). For example, vehicle classification system 230 can perform an action based on the classification of the vehicle.

In some implementations, vehicle classification system 230 can record metrics associated with the vehicle. Additionally, or alternatively, vehicle classification system 230 can aggregate metrics by classification. In some implementations, when aggregating metrics, vehicle classification system 230 can aggregate millions, billions, trillions, etc. of data elements. In this way, vehicle classification system 230 can aggregate a data set that cannot be processed manually or objectively by human actors.

In some implementations, vehicle classification system 230 can perform analytics after determining a classification of a vehicle. For example, vehicle classification system 230 can perform analytics on a quantity of various classifications of vehicles present on a particular segment of road (e.g., by hour of the day, day of the week, month of the year, etc.). In some implementations, vehicle classification system 230 can perform traffic management after determining a classification of a vehicle. For example, vehicle classification system 230 can send a set of instructions to user devices 210 associated with vehicles of a particular classification, such as to use a particular road type, to use a particular lane on a road, to adjust speed, and/or the like.

In some implementations, vehicle classification system 230 can control a traffic light to minimize traffic congestion (e.g., by sending a set of instructions to the traffic light). Additionally, or alternatively, vehicle classification system 230 can provide a set of instructions to user device 210 to use a particular route before or during a trip. Additionally, or alternatively, vehicle classification system 230 can determine a vehicle violation, such as a possible weight violation on a particular type of road, a violation of a high-occupancy vehicle lane, and/or the like. In this case, vehicle classification system 230 can provide a set of instructions to user device 210 associated with the vehicle to reduce or eliminate the violation, such as by changing lanes or using a different route, can provide a set of instructions to dispatch law enforcement, and/or the like.

Additionally, or alternatively, vehicle classification system 230 can identify possible vehicles associated with an amber alert or another type of crime based on the classification of the vehicle. In this case, vehicle classification system 230 can provide a set of instructions to user device 210 to dispatch law enforcement, to reroute vehicles away from a vehicle possibly associated with a crime, and/or the like. Additionally, or alternatively, vehicle classification system 230 can perform an action related to urban planning and/or emission control. For example, vehicle classification system 230 can identify areas with a threshold amount of congestion as areas not suitable for residential development, as candidates for road and/or lane expansion, and/or the like (and can provide information identifying the areas to user device 210). Additionally, or alternatively, and as another example, vehicle classification system 230 can identify areas associated with a threshold amount of traffic as areas of high pollution, can reroute vehicles to reduce an amount of pollution in a particular area (e.g., by providing a set of instructions to user device 210), and/or the like.

In some implementations, vehicle classification system 230 can generate a report. For example, vehicle classification system 230 can generate a report that includes information identifying a classification of a vehicle, a quantity of vehicles associated with a particular classification, and/or the like. In some implementations, vehicle classification system 230 can send a message to a user device 210 (e.g., associated with a highway manger) that identifies a classification of a vehicle. For example, vehicle classification system 230 can provide the message to user device 210 for display.

In some implementations, vehicle classification system 230 can generate a report and/or an alert related to fuel consumption, driving style (e.g., acceleration, deceleration, speed, etc.), and/or the like for a vehicle. In some implementations, vehicle classification system 230 can generate a report and/or an alert based on a classification of a vehicle. For example, information related to acceleration and/or deceleration of the vehicle can be less relevant for a large vehicle (e.g., a truck that has a threshold weight) than for a passenger car (e.g., a vehicle with less than a threshold weight). In some implementations, vehicle classification system 230 can provide the report and/or the alert to user device 210 and/or server device 220 for display.

In some implementations, vehicle classification system 230 can store information identifying a classification of a vehicle. For example, vehicle classification system 230 can provide information identifying a classification of a vehicle to server device 220 to cause server device 220 to store the information. In some implementations, vehicle classification system 230 can store millions, billions, trillions, etc. of data elements. In this way, vehicle classification system 230 can store a data set that cannot be processed manually or objectively by human actors.

In some implementations, vehicle classification system 230 can schedule a meeting. For example, vehicle classification system 230 can use electronic calendars to identify an available time for highway managers to meet to discuss classifications of vehicles on a particular segment of highway (e.g., for traffic management purposes).

In this way, vehicle classification system 230 can perform an action based on the classification of the vehicle.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, a vehicle classification system can classify vehicles into a set of classifications (e.g., that can include more than two classifications) using an RNN. This permits the vehicle classification system to more quickly and accurately classify a vehicle relative to other techniques, thereby conserving processing resources. In addition, this permits performance of an action based on a more accurate classification relative to other techniques, thereby conserving processing resources that would otherwise have been consumed due to inaccurate classification of the vehicle.

Although implementations were described herein with reference to motor vehicles, the implementations apply equally to other types of vehicles, such as water craft, aircraft, etc.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive global positioning system (GPS) data and values for a set of metrics at a set of GPS points that form a GPS track of a vehicle;
      determine additional values for additional metrics using the GPS data or the values for the set of metrics;
      determine a set of vectors for the set of GPS points using the GPS data, the values, or the additional values,
         the set of vectors to be used in a recurrent neural network (RNN) to classify the vehicle;
      process the set of vectors via one or more sets of RNN layers of the RNN,
         the one or more sets of RNN layers including:
            one or more input layers,
            multiple sets of feed forward layers,
            a set of recurrent layers, and
            an output layer;
      determine a classification of the vehicle using a result of processing the set of vectors,
         the result being output by the output layer; and
      perform an action based on the classification of the vehicle.

2. The device of claim 1, where the one or more processors are further to:
   train the RNN using a training set of vectors prior to receiving the GPS data or the values for the set of metrics.

3. The device of claim 1, where the one or more processors are further to:
   combine the GPS data, the values, or the additional values to generate a numerical representation of the GPS data, the values, or the additional values; and
   where the one or more processors, when determining the set of vectors, are to:
      determine the set of vectors based on combining the GPS data, the values, or the additional values.

4. The device of claim 1, where the one or more processors, when receiving the GPS data or the values, are to:
   receive the GPS data or the values at a low frequency interval.

5. The device of claim 1, where the one or more processors, when determining the additional values, are to:
  determine a road type on which the vehicle is travelling using the GPS data or the values.

6. The device of claim 1, where the one or more processors, when determining the classification, are to:
  determine the classification using a fixed-length vector output by the output layer.

7. The device of claim 1, where the one or more processors, when performing the action, are to:
  generate a report or an alert based on the classification of the vehicle,
    the report or the alert being related to fuel consumption or driving style of the vehicle.

8. A non-transitory computer-readable medium storing instructions, the instructions comprising:
  one or more instructions that, when executed by one or more processors, cause the one or more processors to:
    receive global positioning system (GPS) data or values for a set of metrics at a set of GPS points that form a GPS track of a vehicle;
    determine additional values for additional metrics using the GPS data or the values for the set of metrics;
    determine a set of vectors for the set of GPS points using the GPS data, the values, or the additional values,
      the set of vectors to be used in a recurrent neural network (RNN) to classify the vehicle;
    process the set of vectors via one or more sets of RNN layers of the RNN,
      the one or more sets of RNN layers including:
        one or more input layers,
        multiple sets of feed forward layers,
        a set of recurrent layers, and
        an output layer;
    determine a classification of the vehicle using a result of processing the set of vectors,
      the result being output by the output layer; and
    perform an action based on the classification of the vehicle.

9. The non-transitory computer-readable medium of claim 8, where the one or more instructions, that cause the one or more processors to process the set of vectors, cause the one or more processors to:
  process a first vector, of the set of vectors, via a first set of RNN layers, of the one or more sets of RNN layers, that includes:
    an input layer, of the one or more input layers,
    a first set of feed forward layers, of the multiple sets of feed forward layers, and
    a first set of recurrent layers, of the set of recurrent layers; and
  provide the first vector to a second set of recurrent layers, of the set of recurrent layers, included in a second set of RNN layers.

10. The non-transitory computer-readable medium of claim 9, where the one or more instructions, when executed by the one or more processors, further cause the one or more processors to:
  process the first vector and a second vector, of the set of vectors, via the second set of recurrent layers;
  provide the result of processing the first vector and the second vector to a second set of feed forward layers, of the multiple sets of feed forward layers, included in the second set of RNN layers to further process the result; and
  output the result via the output layer after processing the first vector and the second vector using the second set of feed forward layers.

11. The non-transitory computer-readable medium of claim 8, where the set of recurrent layers is a set of long short-term memory (LSTM) layers.

12. The non-transitory computer-readable medium of claim 8, where the one or more sets of RNN layers include a pooling layer.

13. The non-transitory computer-readable medium of claim 8, where the result is a fixed-length vector.

14. The non-transitory computer-readable medium of claim 8, where the one or more instructions, that cause the one or more processors to perform the action, cause the one or more processors to:
  generate a report that includes information identifying:
    the classification of the vehicle, or
    a quantity of vehicles associated with the classification.

15. A method, comprising:
  receiving, by a device, global positioning system (GPS) data or values for a set of metrics at a set of GPS points that form a GPS track of a vehicle;
  determining, by the device, additional values for additional metrics using the GPS data or the values for the set of metrics;
  determining, by the device, a set of vectors for the set of GPS points using the GPS data, the values, or the additional values,
    the set of vectors to be used in a recurrent neural network (RNN) to classify the vehicle;
  processing, by the device, the set of vectors via one or more sets of RNN layers of the RNN,
    the one or more sets of RNN layers including:
      one or more input layers,
      multiple sets of feed forward layers,
      a set of recurrent layers, and
      an output layer;
  determining, by the device, a classification of the vehicle using a result of processing the set of vectors,
    the result being output by the output layer; and
  performing, by the device, an action based on the classification of the vehicle.

16. The method of claim 15, where the multiple sets of feed forward layers include:
  a set of fully-connected pre-processing layers, and
  a set of fully-connected post-processing layers.

17. The method of claim 15, further comprising:
  modifying a weight that the one or more sets of RNN layers use to process the set of vectors during training of the RNN.

18. The method of claim 15, where the one or more sets of RNN layers include a pooling layer that implements a pooling function,
  the pooling function including:
    max pooling, or
    average pooling.

19. The method of claim 15, where determining the classification comprises:
  determining the classification using information identifying a probability that the vehicle is one or more classifications,
    the one or more classifications including the classification.

20. The method of claim 15, where determining the classification comprises:

determining the classification based on an average result of processing the set of vectors multiple times using the RNN.

* * * * *